United States Patent
Chen et al.

(10) Patent No.: US 8,432,415 B2
(45) Date of Patent: *Apr. 30, 2013

(54) IMAGE PROCESSING METHOD

(75) Inventors: I-Fei Chen, Taoyuan County (TW);
I-Fen Shih, Taoyuan County (TW);
Jian-Chyn Liu, Taoyuan County (TW);
Chien-Chung Chen, Taoyuan County (TW); Wen-Shu Chien, Taoyuan County (TW); I-Fang Li, Taoyuan County (TW); Wei-Ting Hsieh, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 796 days.

This patent is subject to a terminal disclaimer.

(21) Appl. No.: 12/240,968

(22) Filed: Sep. 29, 2008

(65) Prior Publication Data

US 2009/0085936 A1    Apr. 2, 2009

(30) Foreign Application Priority Data

Sep. 29, 2007 (TW) ................. 96136591 A

(51) Int. Cl.
*G09G 5/00* (2006.01)
*G06F 3/41* (2006.01)
(52) U.S. Cl.
USPC ........... 345/661; 345/173; 345/649; 345/650; 345/660
(58) Field of Classification Search ............ 345/173, 345/179, 668
See application file for complete search history.

(56) References Cited

U.S. PATENT DOCUMENTS

| | | | |
|---|---|---|---|
| 5,523,775 A * | 6/1996 | Capps | ........................... 345/179 |
| 5,596,346 A | 1/1997 | Leone et al. | |
| 2004/0196267 A1 | 10/2004 | Kawai et al. | |
| 2005/0237308 A1 | 10/2005 | Autio et al. | |
| 2006/0082571 A1* | 4/2006 | McDaniel | ...................... 345/419 |

FOREIGN PATENT DOCUMENTS

| | | |
|---|---|---|
| TW | 200521881 | 7/2005 |
| TW | 200701116 | 1/2007 |
| WO | 2007000743 | 1/2007 |

OTHER PUBLICATIONS

Correspondence with Representative of Applicant (Dec. 11, 2012 to Dec. 13, 2012).*
Proposed Amendment to Claims 1, 9 and 13.*
"Summons to Attend Oral Proceedings for Europe Counterpart Application," Issued on Sep. 29, 2010, p. 1-p. 11.
"Office Action of Taiwan Counterpart Application", issued on Jun. 15, 2011, p. 1-p. 23.

* cited by examiner

*Primary Examiner* — Kee M Tung
*Assistant Examiner* — Sing-Wai Wu
(74) *Attorney, Agent, or Firm* — Jianq Chyun IP Office

(57) ABSTRACT

An image processing method is provided. The image processing method is applicable to a display having a stream of drawing as an input for selecting at least a portion of an image thereon as a selected image region. The method includes steps of identifying the input as a closed region input and then performing an image operation.

12 Claims, 8 Drawing Sheets

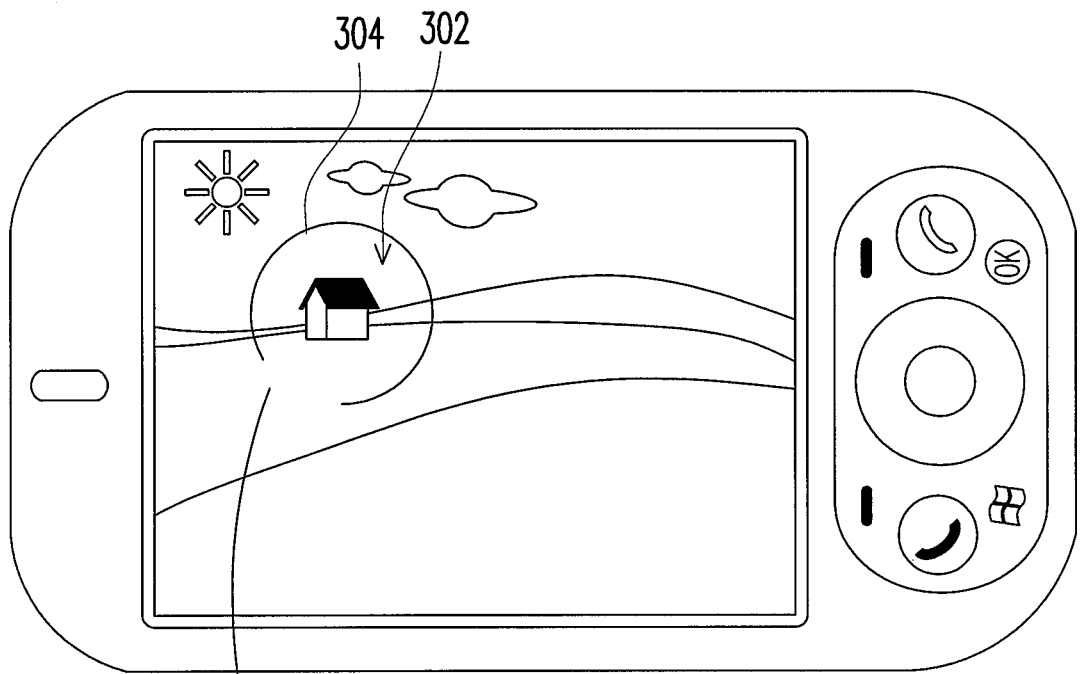
FIG. 3B
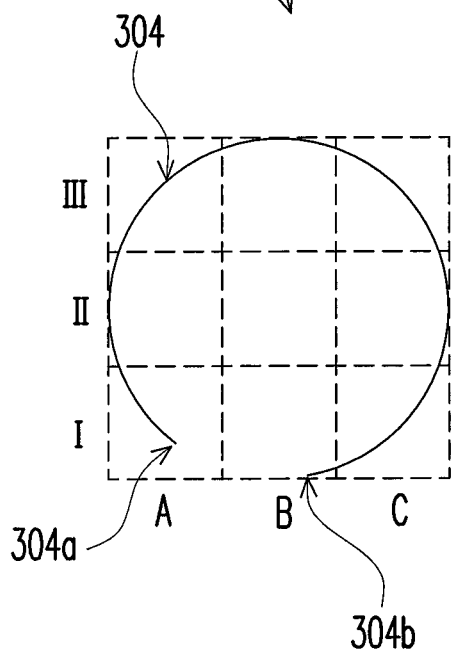
FIG. 3B'
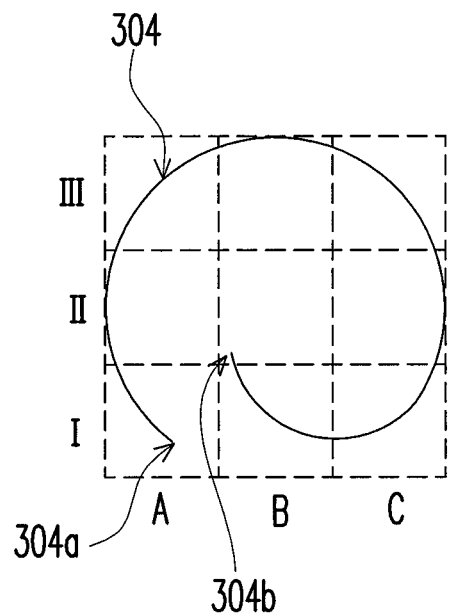
FIG. 3B"

IMAGE PROCESSING METHOD

CROSS-REFERENCE TO RELATED APPLICATION

This application claims the priority benefit of Taiwan application serial No. 96136591, filed on Sep. 29, 2007. The entirety of the above-mentioned patent application is hereby incorporated by reference herein and made a part of this specification.

BACKGROUND OF THE INVENTION

1. Field of the Invention

The present invention relates to a data processing method. More particularly, the present invention relates to an image processing method.

2. Description of Related Art

Since the coming of digital era, the early camera used to record static frames on a soft negative film makes it impossible to immediately review the shot images, and it takes additional time and money to develop the film into photos. Thus, the camera is gradually replaced by digital cameras which can immediately review the captured images, and can even be linked to a developing machine to have the images directly transferred thereto and be developed.

Besides immediately reviewing the images on the camera, the advantage of image digitalization also lies in sharing the digital images through network or wireless transmission rapidly, or browsing the images on other devices equipped with a display. Currently, portable devices equipped with a display for viewing an image are varied, such as cell-phones or personal digital processors. However, in order to view an image or even perform an image processing operation, for example, zooming in, out, or moving an image, on a cell-phone or a personal digital processor, the user has to press several keys or buttons to select the image region or the image region for performing the image operation. The above operating method is not only complicated but slow in action. Besides, the functions of the keys cannot be simplified in design, and further the keys cannot be reduced to diminish the size of the device.

SUMMARY OF THE INVENTION

The present invention is directed to provide an image processing method, applicable to a display having a stream of drawing as an input, for zooming in or out an image.

The present invention is further directed to an image processing method, in which only an input step is needed to process at least a portion of the image shown on the display.

The present invention provides an image processing method, which is applicable to a display having a stream of drawing as an input for selecting at least a portion of an image thereon as a selected image region. The method includes identifying the input as a closed region input, and performing an image magnification operation In the image processing method according to an embodiment of the present invention, the stream of drawing completely surrounds the selected image region.

In the image processing method according to an embodiment of the present invention, the stream of drawing partially surrounds the selected image region.

In the image processing method according to an embodiment of the present invention, the stream of drawing includes an initial point, an end point, and a plurality of drawing connection points between the initial point and the end point. Further, the step of identifying the input as a closed region input includes: identifying a minimum external border of the stream of drawing, according to relative coordinates of the initial point, the end point, and the drawing connection points of the stream of drawing on the display; next, equally dividing an image region enclosed by the minimum external border into several sub-regions; after that, identifying a first sub-region and a second sub-region where the initial point and the end point are located respectively; then, when the second sub-region and the first sub-region are overlapping or adjacent to each other, identifying the input as the closed region input. Moreover, the minimum external border is of a rectangular shape. The step of identifying the input as the closed region input further includes: when the second sub-region and the first sub-region are not overlapping or adjacent to each other, while a third sub-region in which at least one of the drawing connection points on the stream of drawing and close to the end point is located is overlapping or adjacent to the first sub-region, identifying the input as the closed region input. Besides, before performing the image magnification operation, the method further comprises identifying a drawing forming direction of the stream of drawing from the initial point through the drawing connection points to the end point. The step of performing the image magnification operation includes: when the drawing forming direction is identical to a predetermined direction, performing the image magnification operation. The predetermined direction includes a clockwise direction.

In the image processing method according to an embodiment of the present invention, the stream of drawing includes a gesture figure directly formed on the display.

In the image processing method according to an embodiment of the present invention, the input includes a drawing initiation action, a drawing connection action, and a drawing ending action. The drawing ending action triggers the image magnification operation.

In the image processing method according to an embodiment of the present invention, the image magnification operation includes zooming in the image by a predetermined multiple.

In the image processing method according to an embodiment of the present invention, the image magnification operation includes zooming in the selected image region by a predetermined multiple.

The present invention further provides an image processing method, which is applicable to a display having a stream of drawing as an input for selecting at least a portion of an image thereon as a selected image region. The input at least includes a drawing ending action. The method includes: identifying a drawing forming direction for the stream of drawing; and when the drawing forming direction is identical to a predetermined direction, the drawing ending action triggering an image magnification operation.

In the image processing method according to an embodiment of the present invention, the predetermined direction includes a clockwise direction.

In the image processing method according to an embodiment of the present invention, the stream of drawing completely surrounds the selected image region.

In the image processing method according to an embodiment of the present invention, the stream of drawing partially surrounds the selected image region.

In the image processing method according to an embodiment of the present invention, the step of identifying the drawing forming direction further includes: identifying a minimum external border of the stream of drawing, according to relative coordinates of an initial point, an end point, and a plurality of drawing connection points between the initial point and the end point of the stream of drawing on the display; next, equally dividing an image region enclosed by the minimum external border into several sub-regions; then, identifying a first sub-region and a second sub-region where the initial point and the end point are located respectively; after that, when the second sub-region and the first sub-region are overlapping or adjacent to each other, identifying the input as the closed region input. The minimum external border is of a rectangular shape. Further, the step of identifying the input as the closed region input includes: when the second sub-region and the first sub-region are not overlapping or adjacent to each other, while a third sub-region in which at least one of the drawing connection points on the stream of drawing and close to the end point is located is overlapping or adjacent to the first sub-region, identifying the input as the closed region input.

In the image processing method according to an embodiment of the present invention, the stream of drawing includes a gesture figure directly formed on the display.

In the image processing method according to an embodiment of the present invention, the image magnification operation includes zooming in the image.

In the image processing method according to an embodiment of the present invention, the image magnification operation includes zooming in the selected image region.

The present invention further provides an image processing method, which is applicable to a display having a stream of drawing as an input for selecting at least a portion of an image thereon as a selected image region. The method includes identifying the input as a closed region input, and performing an image minification operation.

In the image processing method according to an embodiment of the present invention, the stream of drawing completely surrounds the selected image region.

In the image processing method according to an embodiment of the present invention, the stream of drawing partially surrounds the selected image region.

In the image processing method according to an embodiment of the present invention, the stream of drawing includes an initial point, an end point, and a plurality of drawing connection points between the initial point and the end point. Further, before performing the image minification operation, the method further comprises identifying a drawing forming direction of the stream of drawing from the initial point through the drawing connection points to the end point. The step of performing the image minification operation includes: when the drawing forming direction is identical to a predetermined direction, performing the image minification operation. The predetermined direction includes a clockwise direction. The step of identifying the input as a closed region input further includes: identifying a minimum external border of the stream of drawing, according to relative coordinates of the initial point, the end point, and the drawing connection points of the stream of drawing on the display; next, equally dividing an image region enclosed by the minimum external border into several sub-regions; then, identifying a first sub-region and a second sub-region where the initial point and the end point are located respectively; after that, when the second sub-region and the first sub-region are overlapping or adjacent to each other, identifying the input as the closed region input. The minimum external border is of a rectangular shape. Moreover, the step of identifying the input as the closed region input further includes: when the second sub-region and the first sub-region are not overlapping or adjacent to each other, while a third sub-region in which at least one of the drawing connection points on the stream of drawing and close to the end point is located is overlapping or adjacent to the first sub-region, identifying the input as the closed region input.

In the image processing method according to an embodiment of the present invention, the stream of drawing includes a gesture figure directly formed on the display.

In the image processing method according to an embodiment of the present invention, the input includes a drawing initiation action, a drawing connection action, and a drawing ending action. The drawing ending action triggers the image minification operation.

In the image processing method according to an embodiment of the present invention, the image minification operation includes zooming out the image by a predetermined multiple.

In the image processing method according to an embodiment of the present invention, the image minification operation includes zooming out the selected image region by a predetermined multiple.

In the present invention, a stream of drawing is directly formed on a display as an input. Besides, the image on the display is processed, for example, magnification, minification, partial magnification, and partial minification, when the stream of drawing is input, according to the information of the input stream of drawing, including whether the stream of drawing fits the closed region input and the drawing forming direction of the stream of drawing. Therefore, the user does not have to perform any additional input step to process the image on the display after the stream of drawing is input on the display.

In order to make the aforementioned and other objects, features and advantages of the present invention comprehensible, embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3A' is a partial enlarged view of FIG. 3A.

FIG. 3B is a view illustrating the step of identifying the input as a closed region input according to an embodiment of the present invention.

FIG. 3B' is a partial enlarged view of FIG. 3B.

FIG. 3B" is a view illustrating the step of identifying the input as a closed region input according to another embodiment of the present invention.

FIG. 3C' is a partial enlarged view of FIG. 3C.

FIG. 3C" is a view illustrating the step of identifying the input as a closed region input according to another embodiment of the present invention.

DESCRIPTION OF EMBODIMENTS

Figure 1:
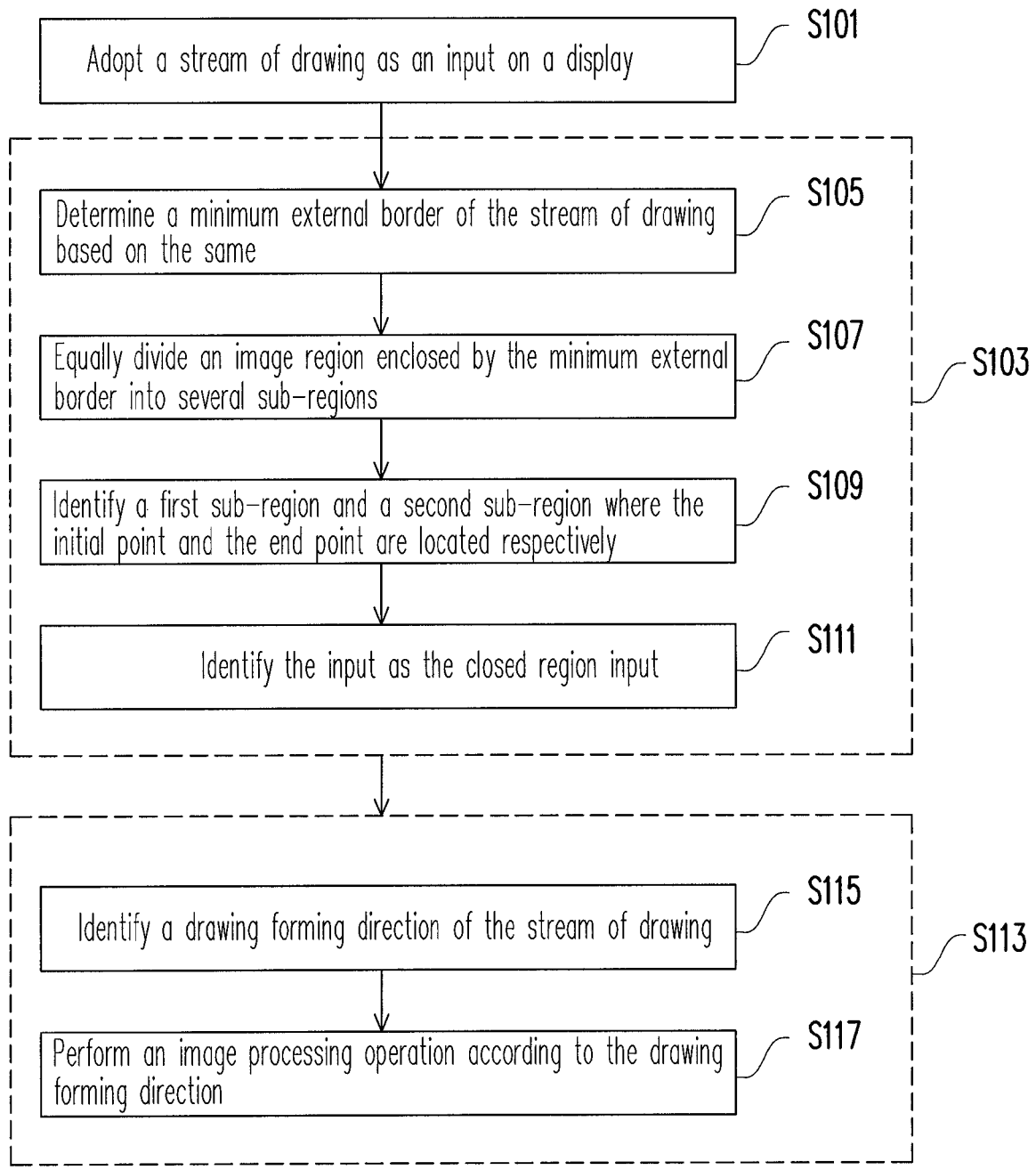
FIG. 1 is a flow chart of an image processing method according to an embodiment of the present invention.
Figure 2A:
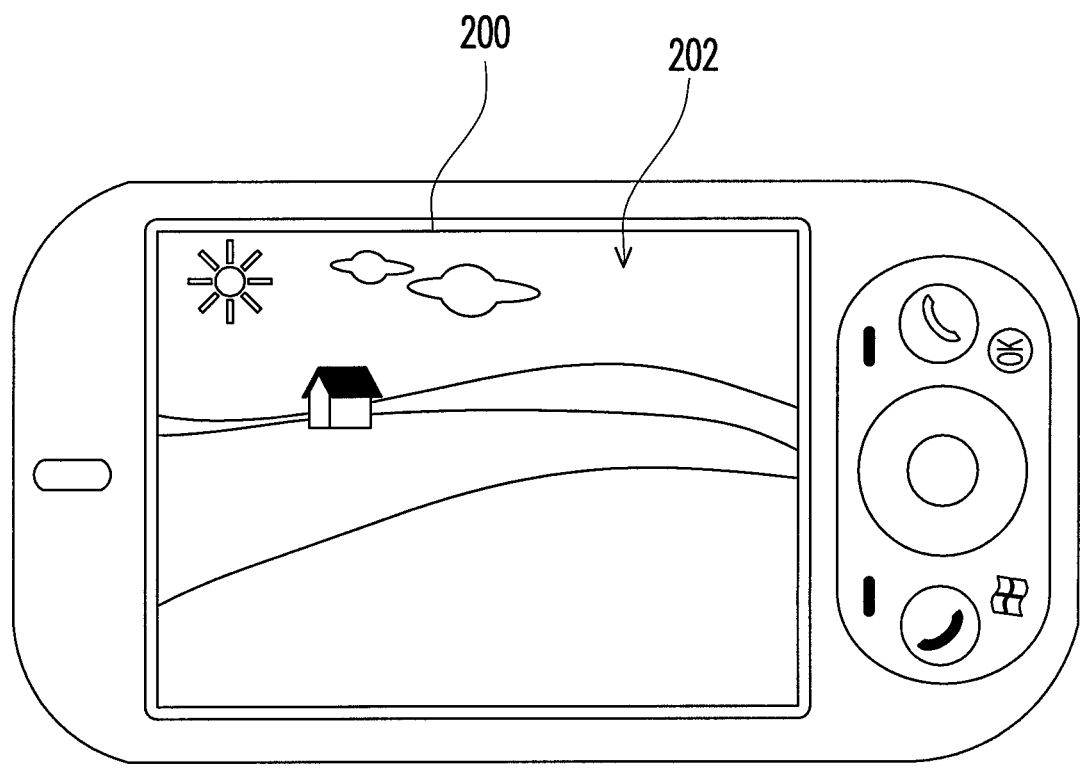
FIGS. 2A-2C are views showing the practical operations of an image processing method for zooming in an image according to an embodiment of the present invention.
Figure 2B:
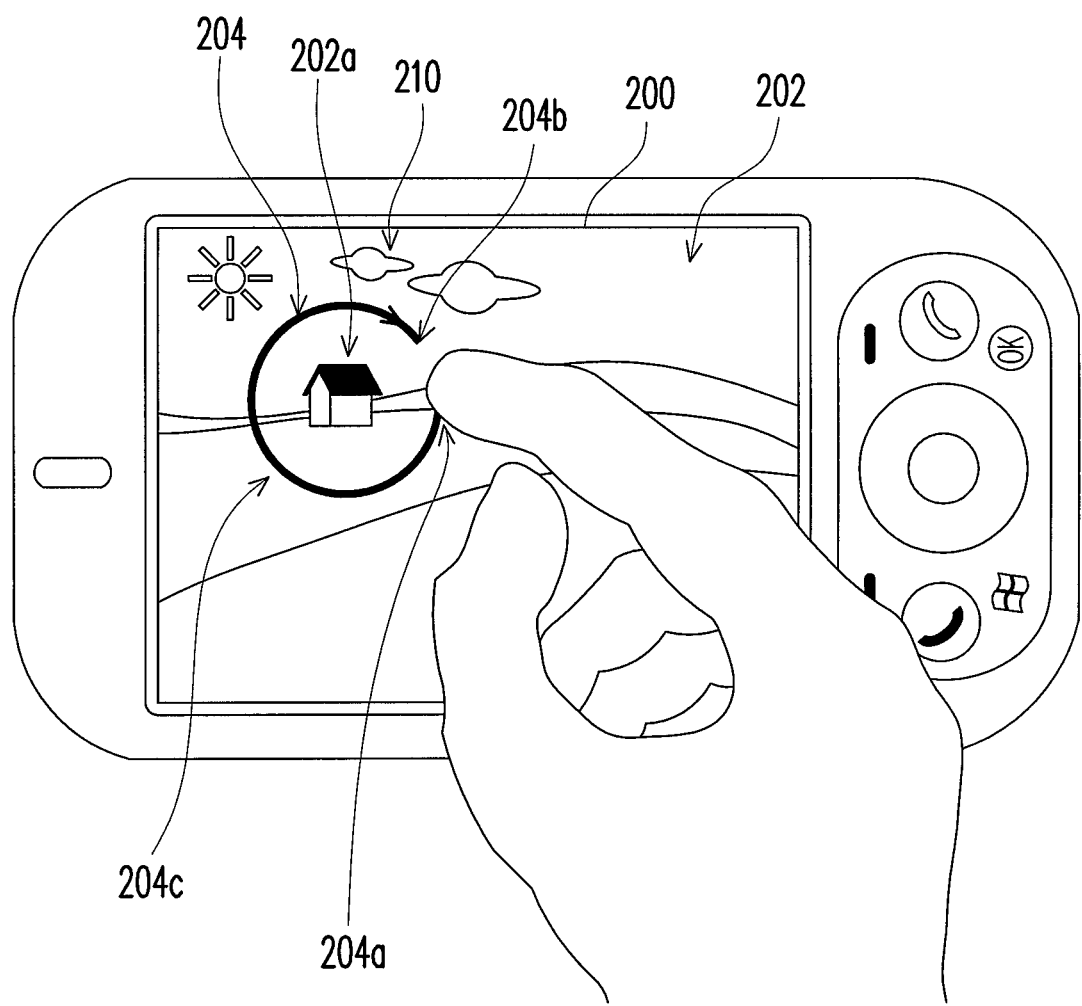
Figure 2C:
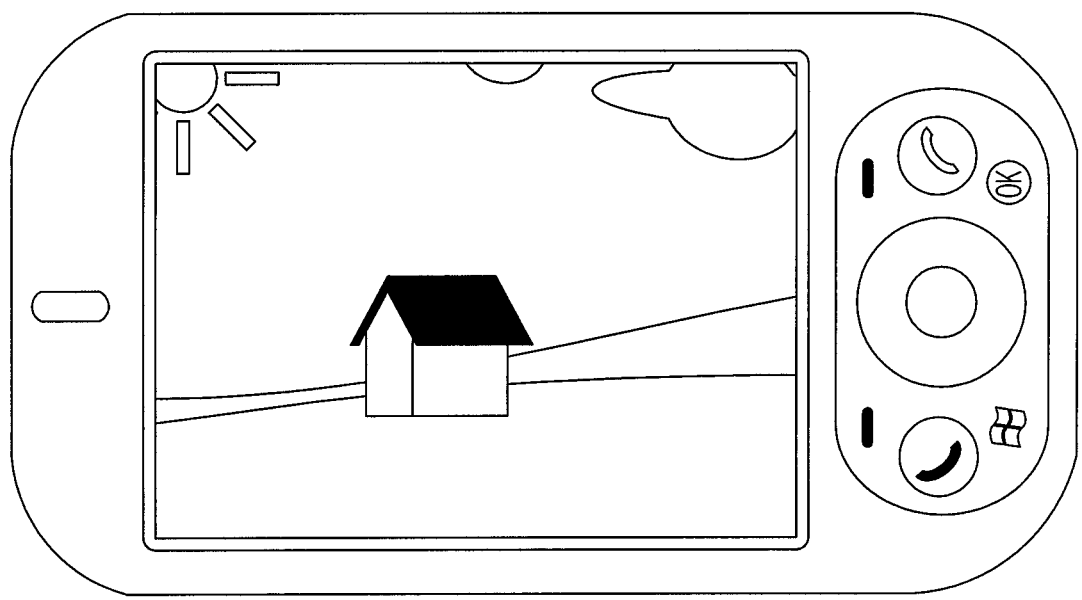

FIG. 1 is a flow chart of an image processing method according to an embodiment of the present invention. FIGS. 2A-2C are views showing the practical operations of an image processing method for zooming in an image according to an embodiment of the present invention. Referring to FIGS. 1, 2A, and 2B, first, a stream of drawing 204 is directly input on a display 200, for selecting at least a portion of an image 202 shown on the display 200 as a selected image region 202a (Step S101). The display 200 is, for example, a touch screen. The method of directly inputting the stream of drawing 204 on the display 200 includes directly forming a gesture figure on the display 200 through a finger, touch pen, or any other component that can perform an input action on the touch screen.

Figure 3A:
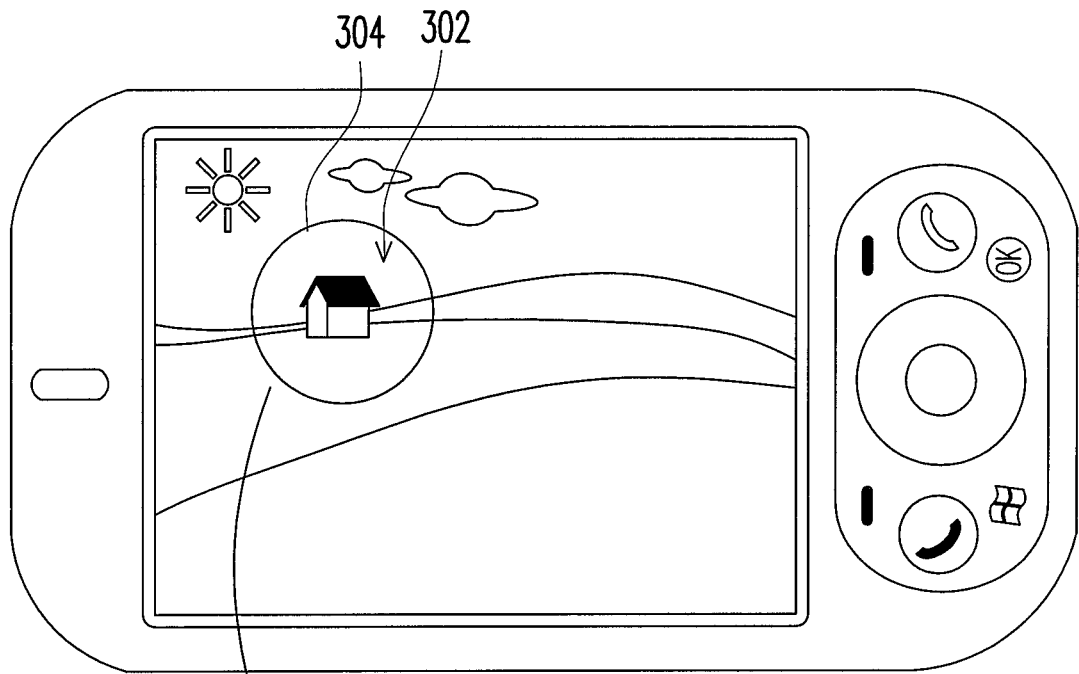
FIG. 3A is a view illustrating the step of identifying the input as a closed region input according to an embodiment of the present invention.
Figure 3A:
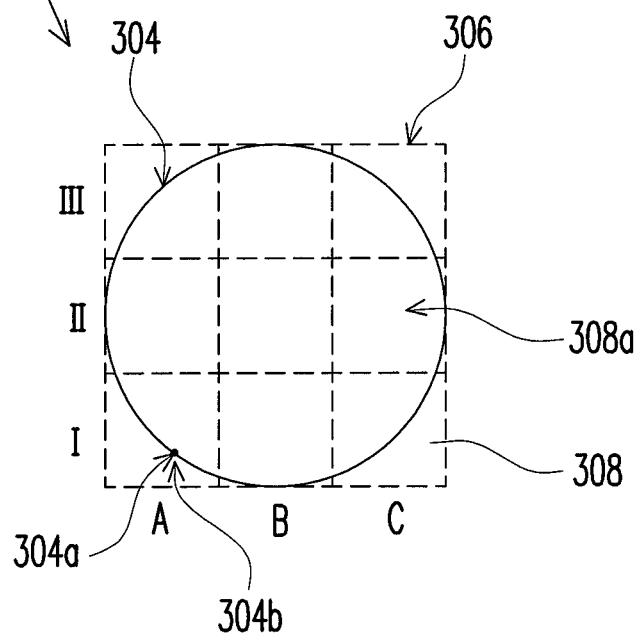
Figure 3C:
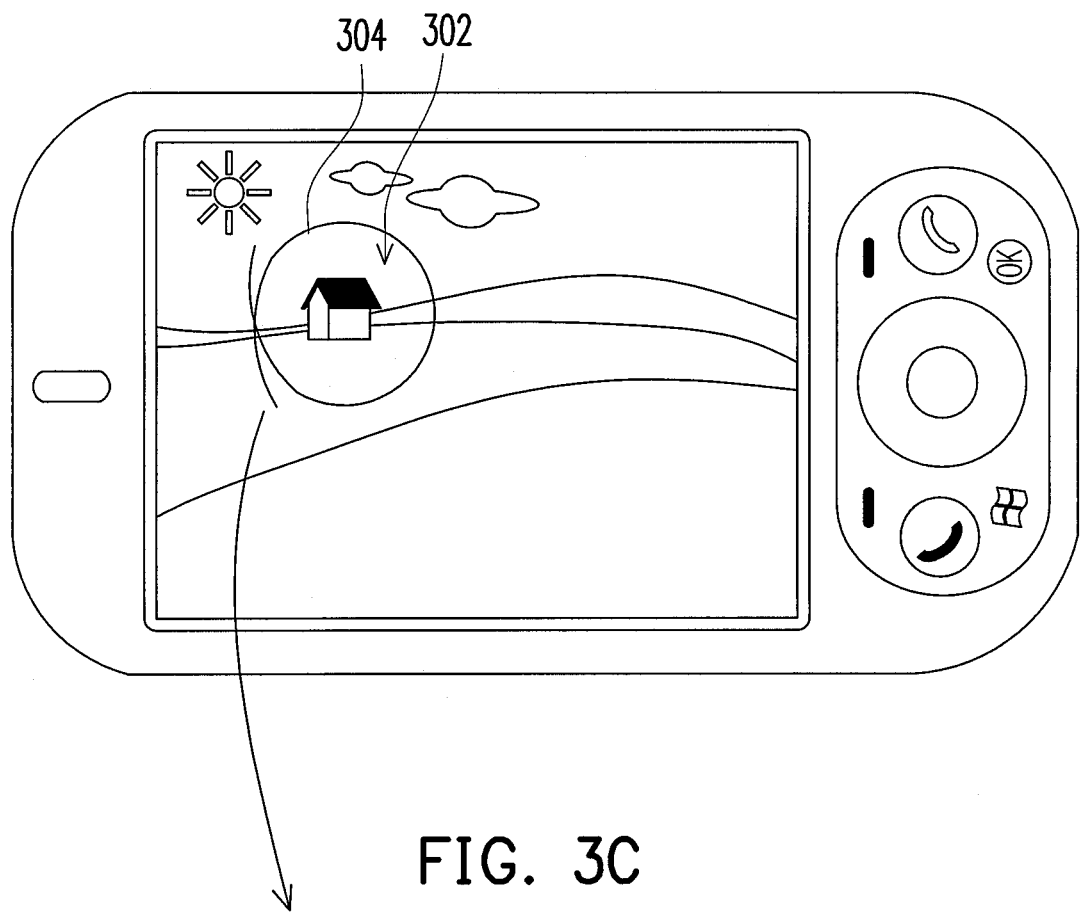
FIG. 3C is a view illustrating the step of identifying the input as a closed region input according to an embodiment of the present invention.
Figure 3C:
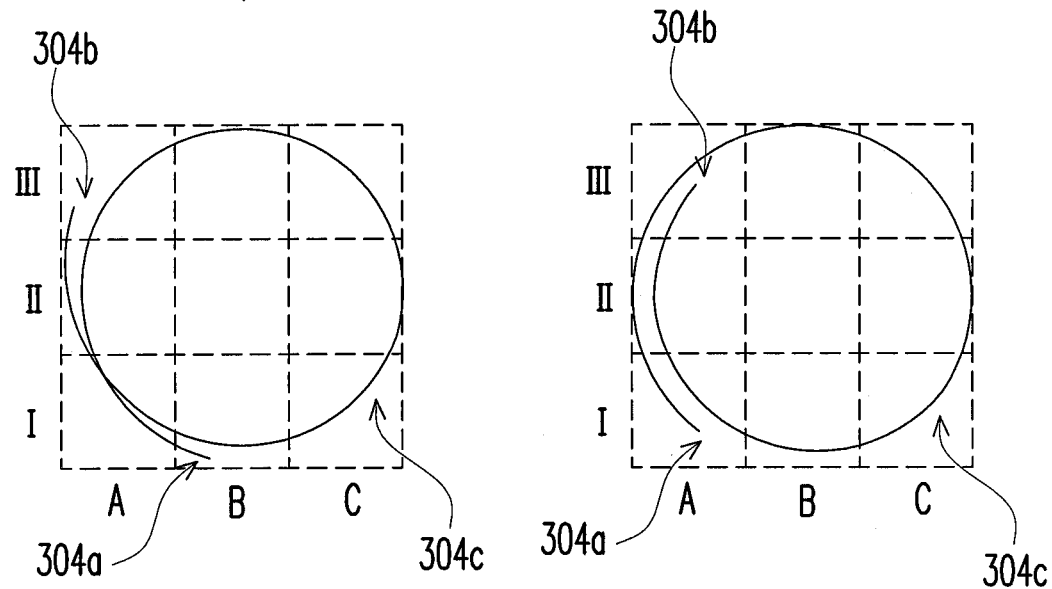

The stream of drawing 204 includes an initial point 204a, an end point 204b, and a plurality of drawing connection points 204c between the initial point 204a and the end point 204b. As for signal inputting, when the stream of drawing 204 is an input, the input includes a drawing initiation action (i.e., the formation of the initial point 204a of the stream of drawing 204), a drawing connection action (i.e., the formation of the drawing connection points 204c of the stream of drawing 204), and a drawing ending action (i.e., the formation of the end point 204b of the stream of drawing 204). Further, the stream of drawing 204 completely surrounds the selected image region 202a (as shown in FIGS. 3A and 3C), or partially surrounds the selected image region 202a (as shown in FIG. 3B).

Then, referring to FIG. 1, in Step S103, the above input of enclosing a selected image region 202a with the stream of drawing 204 is identified as a closed region input. The step of identifying the above input as a closed region input includes: first, identifying a minimum external border of the stream of drawing 204, according to relative coordinates of the initial point 204a, the end point 204b, and the drawing connection points 204c of the stream of drawing 204 (Step S105). As shown in FIGS. 3A-3C, and FIGS. 3A', 3B', 3B", 3C', and 3C", when the stream of drawing 204 is directly input on the display 200, the initial point 204a, the end point 204b, and all the drawing connection points 204c of the stream of drawing are respectively allocated with a coordinate on the display 200. A minimum border 306 (as shown in FIG. 3A') is defined by all the coordinates of the stream of drawing 204. The minimum external border encloses a minimum image region 308 containing the stream of drawing 204/304. The minimum external border 306 is, for example, of a rectangular shape.

Thereafter, in Step S107, the image region 308 enclosed by the minimum external border 306 is equally divided into several sub-regions 308a. According to the embodiment shown in FIGS. 3A', 3B', 3B", 3C', and 3C", the image region enclosed by the minimum external border is equally divided into 3×3 parts. However, the present invention is not limited to the above dividing manner. That is, the inventor can equally divide the image region enclosed by the minimum external border at will.

Next, in Step S109, a first sub-region and a second sub-region where the initial point 204a and the end point 204b are located respectively are identified. Afterward, in Step S111, the input of the stream of drawing 204 is identified as a closed region input. Referring to FIGS. 3A and 3A', when the initial point 304a and the end point 304b of the stream of drawing 304 are the same point, i.e., when the stream of drawing 304 completely surrounds the selected image region 302, a first sub-region IA where the initial point 304a of the stream of drawing 304 is located overlaps a second sub-region IA where the end point is located. Therefore, the input of enclosing the selected image region 302 with the stream of drawing is identified as a closed region input.

However, referring to FIGS. 3B, 3B', and 3B", in another embodiment, the initial point 304a does not overlap the end point 304b of the stream of drawing 304. That is to say, when the stream of drawing 304 partially surrounds the selected image region 302, if the first sub-region IA and the second sub-region IB/IIB where the initial point 304a and the end point 304b are located respectively are adjacent to each other, the input of enclosing the selected image region 302 with the stream of drawing is identified as a closed region input.

Further, referring to FIGS. 3C, 3C', and 3C", the first sub-region IB/IA where the initial point 304a is located and a second sub-region IIIA/IIIA where the end point 304b is located are neither overlapping nor adjacent to each other. If a third sub-region (including regions such as IIA, IA, IB) in which at least one of the drawing connection points 304c on the stream of drawing and close to the end point 304b is located is overlapping or adjacent to the first sub-region IB/IA, the input of enclosing the selected image region 302 with the stream of drawing is identified as the closed region input.

Moreover, the step (S103) of identifying the input of enclosing an selected image region 202a with the stream of drawing 204 as a closed region input further includes: identifying the number of the sub-regions where the drawing connection points on the stream of drawing 204/304 are distributed, in which the minimum value is obtained by subtracting 1 from the total number of the sub-regions substantially at the rim of the minimum external border. That is to say, when the image region enclosed by the minimum external border is equally divided into 3×3 parts, the condition for identifying the input of enclosing the selected image region 302 with the stream of drawing as the closed region input further includes the drawing connection points on the stream of drawing should be distributed in at least seven sub-regions.

Figure 4:
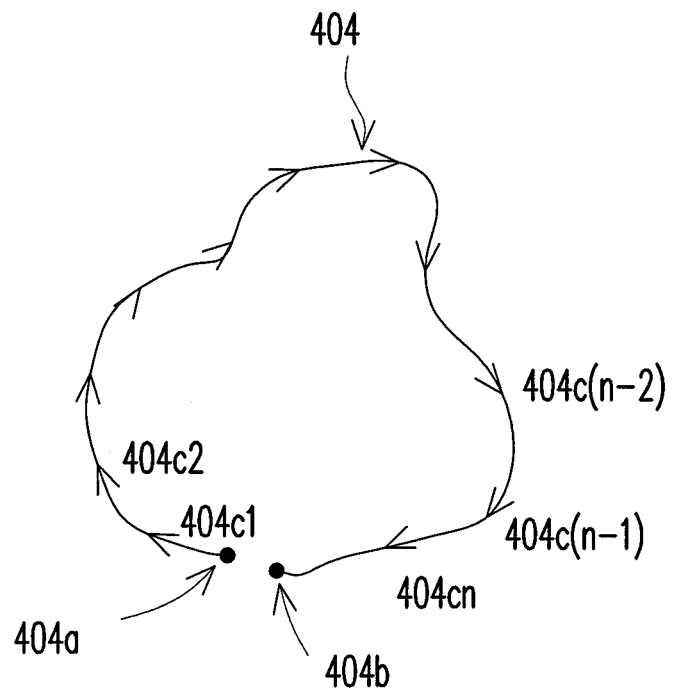
FIG. 4 is a schematic view of a drawing forming direction of the stream of drawing according to an embodiment of the present invention.
Figure 5:
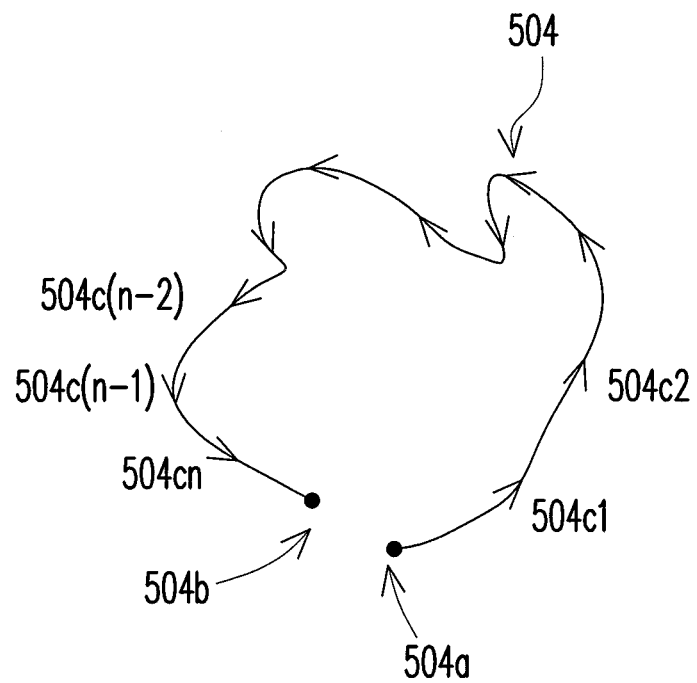
FIG. 5 is a schematic view of a drawing forming direction of the stream of drawing according to another embodiment of the present invention.

Continue referring to FIGS. 1 and 2B, after Step S103, Step S113 is carried out to perform an image operation to the image 202 on the display 200. In Step S113, the image operation further includes: in Step S115, identifying a drawing forming direction 210 of the stream of drawing 204 formed from the initial point 204a through the drawing connection points 204c to the end point 204b, i.e., identifying a net direction for forming the stream of drawing. FIG. 4 is a schematic view of a drawing forming direction of the stream of drawing according to an embodiment of the present invention. FIG. 5 is a schematic view of a drawing forming direction of the stream of drawing according to another embodiment of the present invention. Referring to FIG. 4, in an embodiment, the stream of drawing 404 is constituted by an initial point 404a, an end point 404b, and n drawing connection points 404c. According to the sequence that the stream of drawing 404 is formed from the initial point 404a through n drawing connection points 404c, i.e., the drawing connection points 404c1, 404c . . . 404c(n-2), 404c(n-1), 404cn, to the end point 404b, the forming direction of every adjacent two points on the stream of drawing 404 is integrated into the drawing forming direction of the stream of drawing 404, in which the drawing forming direction is a clockwise direction. Referring to FIG. 5, in this embodiment, though the stream of drawing 504 is not a smooth gesture track, according to FIG. 4, the method for identifying the drawing forming direction of the stream of drawing 404 is applied to the stream of drawing 504 in FIG. 5, so as to obtain a drawing forming direction of the stream of drawing 504, in which the drawing forming direction is an anticlockwise direction.

After that, in Step S117, an image operation is performed to the image 202 shown on the display 200' according to the drawing forming direction 210. That is to say, when the drawing forming direction 210 of the stream of drawing is identical to a predetermined direction, an image operation is performed to the image 202 on the display 200 according to the action defined by the predetermined direction. In other words, when the user directly inputs a stream of drawing constituted by a drawing initiation action, a drawing connection action succeeding the drawing initiation action, and a drawing ending action at last on the display 200, the information of the initial point, the end point, and the drawing connection points on the stream of drawing is obtained. Besides, the image processing steps S103-S113 as shown in FIG. 1 are performed, and the image processing operation in Step S117 is triggered by the drawing ending action. That is to say, during the image processing operation of the present invention, the user does not have to do any action confirmation of the image operation besides the input of the stream of drawing, but only has to effectively input the stream of drawing directly on the display (i.e., the input of the stream of drawing is a closed region input). Once the drawing ending action is finished, an image operation corresponding to the input stream of drawing is performed.

In an embodiment, the predetermined direction of a clockwise direction is defined as a magnification operation. Thus, when the drawing forming direction 210 of the stream of drawing 204 is a clockwise direction, the image 202 shown on the display 200 is zoomed in. For example, the image 202 is zoomed in by a predetermined multiple or the selected image region 202a selected by the stream of drawing 204 is zoomed in by a predetermined multiple. In another embodiment, when the drawing forming direction 210 of the stream of drawing 204 is a clockwise direction, the selected image region 202a selected by the stream of drawing 204 is zoomed in to a full screen mode (as shown in FIG. 2C).

In another embodiment, the predetermined direction of a clockwise direction is defined as a minification operation. Thus, when the drawing forming direction 210 of the stream of drawing 204 is a clockwise direction, the image 202 shown on the display 200 is zoomed out. For example, the image 202 is zoomed out by a predetermined multiple or the selected image region 202a selected by the stream of drawing 204 is zoomed out by a predetermined multiple.

Furthermore, when the drawing forming direction of the stream of drawing is defined as a clockwise direction (i.e., the predetermined direction), an image magnification operation is performed. As such, the image minification operation can be actuated by defining the forming direction of the stream of drawing as an anticlockwise direction, or clicking the display at least once.

In view of the above, according to the present invention, a stream of drawing is directly formed on a display as an input. Besides, the image on the display is processed, for example, magnification, minification, partial magnification, and partial minification, when the stream of drawing is input, according to the information of the input stream of drawing, including whether the stream of drawing fits the closed region input and the drawing forming direction of the stream of drawing. Therefore, the user does not have to perform any additional input step to process the image on the display after the stream of drawing is input on the display.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image processing method for a portable device with a display having a stream of drawing as an input for selecting at least a portion of an image, wherein the stream of drawing comprises an initial point, an end point, and a plurality of drawing connection points between the initial point and the end point, the method comprising:

the portable device identifying the input as a closed region input by identifying a minimum external border of the stream of drawing, according to relative coordinates of the initial point, the end point, and the drawing connection points of the stream of drawing on the display, equally dividing an image region enclosed by the minimum external border into several sub-regions, identifying a first sub-region and a second sub-region where the initial point and the end point are located respectively, identifying the input as the closed region input when the second sub-region and the first sub-region are overlapping or adjacent to each other and identifying the input as the closed region input when the second sub-region and the first sub-region are neither overlapping nor adjacent to each other but a third sub-region in which at least one of the drawing connection points on the stream of drawing and close to the end point is located is overlapping or adjacent to the first sub-region; and the portable device performing an image magnification operation.

2. The image processing method as claimed in claim 1, wherein before the portable device performing the image magnification operation, the method further comprises the portable device identifying a drawing forming direction of the stream of drawing from the initial point through the drawing connection points to the end point.

3. The image processing method as claimed in claim 2, wherein the step of performing the image magnification operation comprises the portable device performing the image magnification operation when the drawing forming direction is identical to a predetermined direction.

4. The image processing method as claimed in claim 1, wherein the input comprises a drawing initiation action, a drawing connection action, and a drawing ending action.

5. The image processing method as claimed in claim 4, wherein the drawing ending action triggers the image magnification operation.

6. An image processing method for a portable device with a display having a stream of drawing as an input for selecting at least a portion of an image, wherein the input at least comprises a drawing ending action and the stream of drawing comprises an initial point, an end point, and a plurality of drawing connection points between the initial point and the end point, the method comprising:

the portable device identifying a drawing forming direction for the stream of drawing;

the portable device identifying the input as a closed region input by identifying a minimum external border of the stream of drawing, according to relative coordinates of the initial point, the end point, and the drawing connection points, equally dividing an image region enclosed by the minimum external border into several sub-regions, identifying a first sub-region and a second sub-region where the initial point and the end point are located respectively, identifying the input as the closed region input when the second sub-region and the first sub-region are overlapping or adjacent to each other and identifying the input as the closed region input when the second sub-region and the first sub-region are neither overlapping nor adjacent to each other but a third sub-region in which at least one of the drawing connection points on the stream of drawing and close to the end point is located is overlapping or adjacent to the first sub-region; and the portable device triggering an image magnification operation by the drawing ending action when the drawing forming direction is identical to a predetermined direction.

7. The image processing method as claimed in claim 6, wherein the stream of drawing completely surrounds the selected image region.

8. An image processing method for a portable device with a display having a stream of drawing as an input for selecting at least a portion of an image, wherein the stream of drawing comprises an initial point, an end point, and a plurality of drawing connection points between the initial point and the end point, the method comprising:

the portable device identifying the input as a closed region input by identifying a minimum external border of the stream of drawing, according to relative coordinates of the initial point, the end point, and the drawing connection points of the stream of drawing on the display, equally dividing an image region enclosed by the minimum external border into several sub-regions, identifying a first sub-region and a second sub-region where the initial point and the end point are located respectively, identifying the input as the closed region input when the second sub-region and the first sub-region are overlapping or adjacent to each other and identifying the input as the closed region input when the second sub-region and the first sub-region are neither overlapping nor adjacent to each other but a third sub-region in which at least one of the drawing connection points on the stream of drawing and close to the end point is located is overlapping or adjacent to the first sub-region; and the portable device performing an image minification operation.

9. The image processing method as claimed in claim 8, wherein before the portable device performing the image minification operation, the method further comprises the portable device identifying a drawing forming direction of the stream of drawing from the initial point through the drawing connection points to the end point.

10. The image processing method as claimed in claim 9, wherein the step of the portable device performing the image minification operation comprises the portable device performing the image minification operation when the drawing forming direction is identical to a predetermined direction.

11. The image processing method as claimed in claim 8, wherein the input comprises a drawing initiation action, a drawing connection action, and a drawing ending action.

12. The image processing method as claimed in claim 11, wherein the drawing ending action triggers the image minification operation.

* * * * *